UNITED STATES PATENT OFFICE.

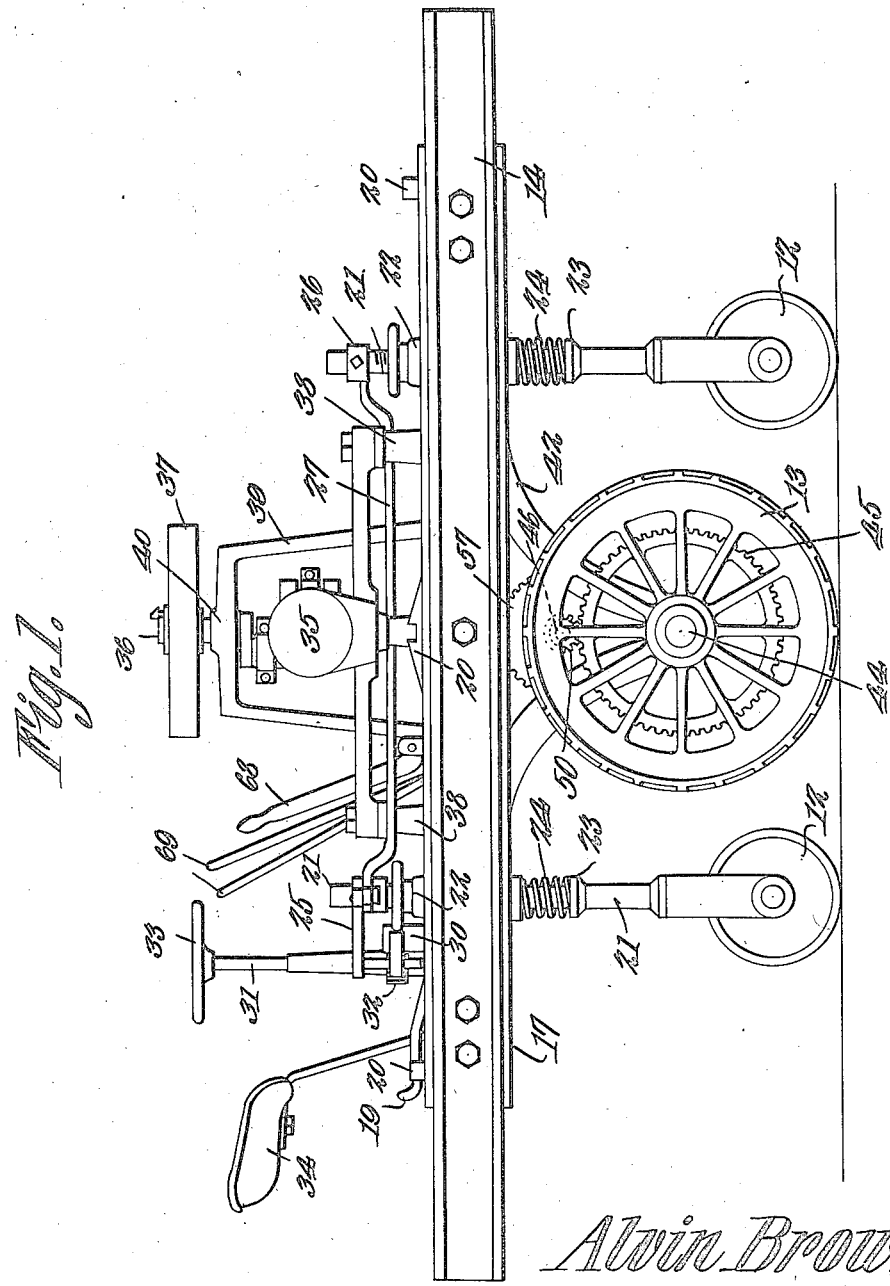

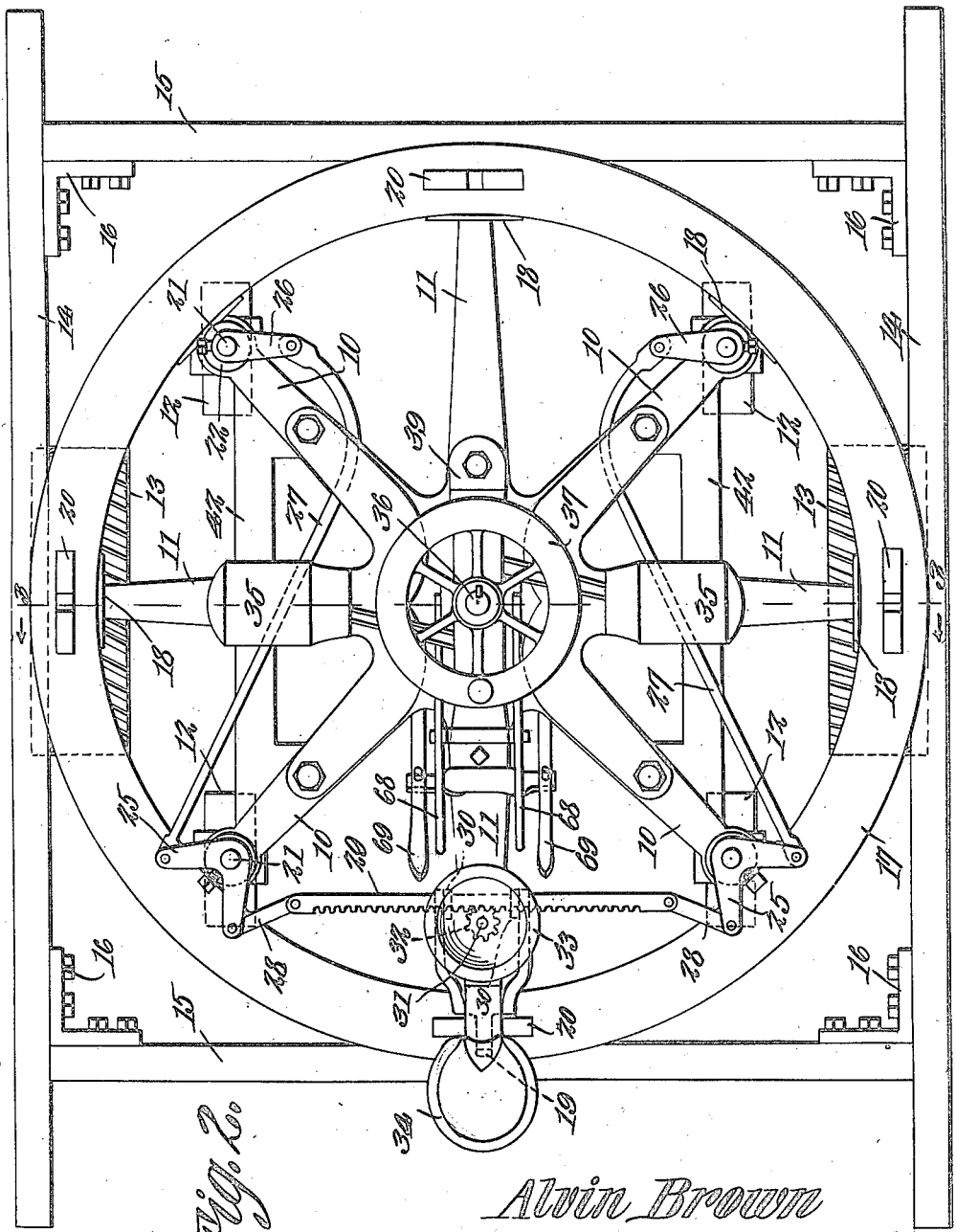

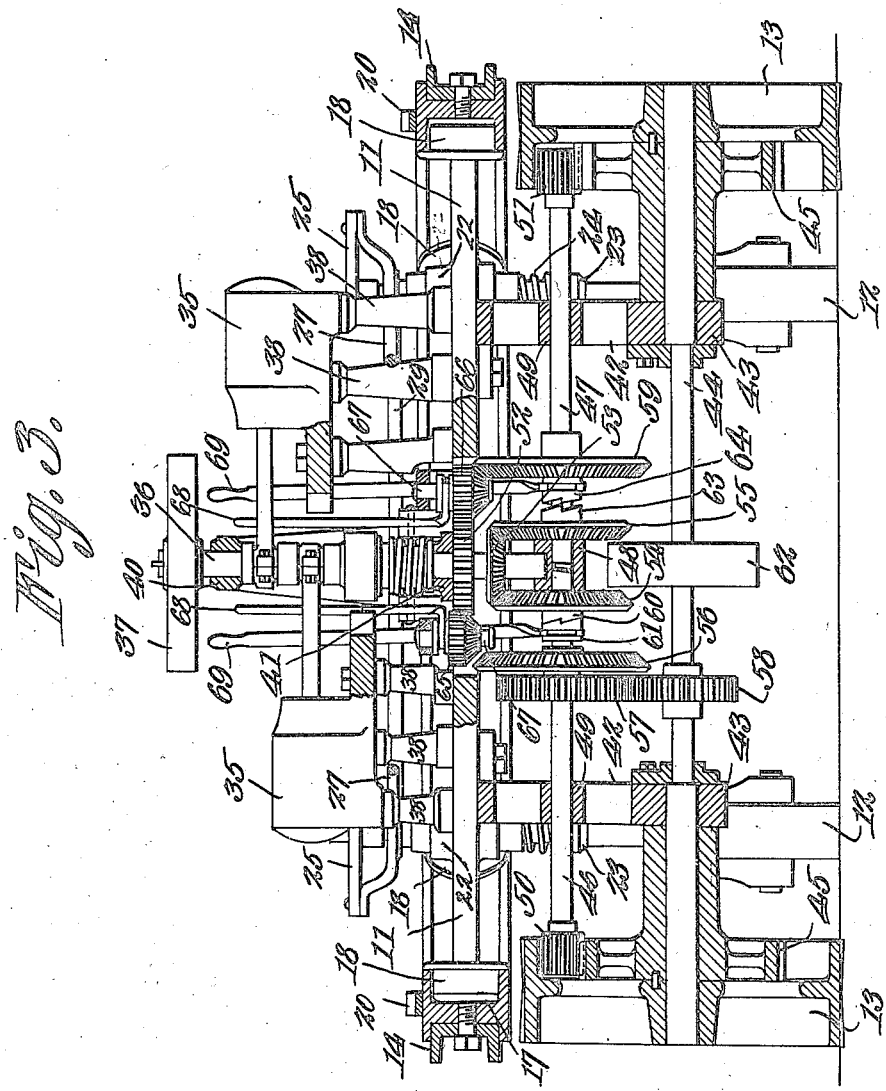

ALVIN BROWN, OF PLAINFIELD, ILLINOIS.

TRACTOR.

1,222,260.

Specification of Letters Patent.  Patented Apr. 10, 1917.

Application filed May 15, 1916. Serial No. 97,621.

*To all whom it may concern:*

Be it known that I, ALVIN BROWN, a citizen of the United States, residing at Plainfield, in the county of Will and State of Illinois, have invented new and useful Improvements in Tractors, of which the following is a specification.

The tractor which is the subject matter of the present application for patent is designed more particularly for farm use, such as hauling plows, harrows, seeders and other agricultural implements and machinery.

The invention has for its object to provide a simple and highly efficient tractor of the kind stated, and one which can be easily controlled and steered.

With the object stated in view, the invention consists in a novel combination and arrangement of parts to be hereinafter described and claimed, and in order that the same may be better understood, reference is had to the accompanying drawings forming a part of this specification.

In the drawings—

Figure 1 is a side elevation of the tractor;

Fig. 2 is a plan view thereof, and

Fig. 3 is a cross section on the line 3—3 of Fig. 2.

Referring specifically to the drawings, the main frame of the tractor is of skeleton construction and suitably shaped to support the engine and other parts to be presently described. As shown more particularly in Fig. 2, this frame is composed of a series of four arms 10 radiating from a common center, and four radial arms 11. The arms 10 are so positioned and arranged that the extremities of two of the same are on one side of the longitudinal center line of the machine, and the other two on the opposite side. The arrangement is also such that two of the arms project forwardly and the other two rearwardly. The outer ends of the arms 10 are supported on caster wheels 12, the arrangement of the arms just described locating said wheels on opposite sides of the longitudinal center line of the machine and also in front of and to the rear of the transverse center line. On opposite sides of the center line of the machine, outside the track of the caster wheels 12, are the traction wheels 13, the same being located in the transverse center line of the machine or midway between the front and rear caster wheels. The main frame is thus supported for travel over the ground by the wheels 12 and 13.

The frame of the machine also includes an auxiliary frame composed of laterally spaced longitudinal side beams 14 and front and rear cross beams 15 rigidly connected by corner brackets 16 and forming a rectangular frame. Between the side and cross beams is mounted a horizontal circular track 17 comprising a ring which is I-shaped in cross section. This ring is rigidly fastened to the side and cross beams and the inner bottom flange of the ring serves as a track on which are mounted flanged rollers or wheels 18 carried by the outer ends of the arms 11. It will therefore be seen that the main and the auxiliary frames are free to swing relative to each other in a horizontal plane, which is for a purpose to be presently described. A means for locking the two frames together is provided, the same comprising a pivoted latch 19 carried by one of the arms 11, the ring 17 having keepers 20 for said latch. These keepers are spaced 90 degrees apart, so that the frames may be swung relative to each other one complete revolution, or through arcs of 90 degrees.

The caster wheels 12 are carried by vertical stems 21 which are swiveled at their upper ends in bearings 22 carried by the extremities of the arms 10. Below the bearings 22, the stems 21 have shoulders 23, and on the stems, between these parts, are mounted coiled springs 24. Thus, the caster wheels are yieldingly supported to reduce shocks and jars to the machine when passing over rough ground.

The caster wheels 12 are also employed as the steering wheels and they are connected to swing together so that a short turn may be made. The steering gear comprises the following parts: On the upper ends of the stems 21 of the rear caster wheels are fixed angle levers 25 and on the stems of the front caster wheels are fixed crank arms 26. The crank arms are connected by links 27 to the respective angle levers, the connection being made with one of the branches thereof, the other branches of the levers being connected by links 28 to a rack bar 29 extending transversely of the machine and supported by brackets 30 mounted on the rear arm 11. The arm 11 also supports an upright steering post 31 having a pinion 32 which meshes with the rack bar 29, the upper end of the steering post having a hand wheel 33. Back of the steering post is a seat 34 for the driver, said seat being carried by the last mentioned arm 11.

It will be seen from the foregoing that all four caster wheels 12 are swung simultaneously when the steering post 31 is operated, the connections swinging the caster wheels in the proper direction to make a short turn.

The main frame carries the motor for propelling the machine, an ordinary multiple-cylinder, internal-combustion engine being provided. The engine cylinders 35 are mounted horizontally and they extend radially around a vertical crank shaft 36 having a fly wheel 37 at its upper end. The arms 10 and 11 of the main frame carry suitable supports 38 for the engine cylinders, and two opposite ones of the arms 11 carry a stand 39 having a bearing 40 for the upper end of the crank shaft, its lower end being supported in a bearing 41 carried by the upper ends of said arms.

The following gearing is provided for transmitting the motion of the engine crank shaft 36 to the traction wheels 13 for propelling the machine:

The main frame carries depending hangers 42 having bearings 43 which support the axle 44 of the traction wheels 13, the latter being loose on the axle. To each traction wheel is fixed a spur gear 45. Above the axle 44 are located two alined, horizontal countershafts 46 and 47, respectively, supported at their inner ends in a bearing 48 carried by the main frame and intermediate their ends in bearings 49 carried by the hangers 42. The lower end of the crank shaft 36 is stepped in the bearing 48 as shown in Fig. 3. On the outer ends of the countershafts are pinions 50 and 51, respectively, one of which meshes with one of the spur gears 45 and the other with the other spur gear.

On the lower end of the crank shaft 36 is fast a spur gear 52, and below the same a bevel pinion 53 is fast on said shaft. On the inner ends of the countershafts 46 and 47 are loosely mounted bevel gears 54 and 55, respectively, both of which are constantly in mesh with the pinion 53 and therefore turn in opposite directions. Adjacent to the bevel gear 54, the countershaft 46 carries a bevel gear 56 and a spur gear 57, both fast on the countershaft, and the latter gear being in mesh with a pinion 58 fast on the axle 44. Adjacent to the bevel gear 55, the countershaft 47 carries a bevel gear 59 fast thereon. On the bevel gear 54 is a clutch member 60 and opposite the same is a coöperating clutch member 61 which latter is slidable on the countershaft 46 to engage the clutch member 60 and to be disengaged from the same, and when said clutch members are engaged, the motion of the crank shaft 36 is transmitted through the pinion 53, gear 54 and clutch members 60 and 61 to the countershaft 46. The motion of the countershaft 46 is transmitted to the traction wheel 13 on this side of the machine through the pinion 50 and the gear 45. The spur gear 57 is fast on the countershaft 46 and transmits the motion of the latter, through the pinion 58, to the axle 44 when the tractor is stationary and used as a motor for driving a separator or other machinery, the axle being provided with a drive pulley 62 for this purpose. When the tractor is used in this manner, the pinion 50 must be loosened so that no motion will be transmitted to the traction wheel.

The gears for driving the other traction wheel 13 are the ones 55 and 59. The gear 55 has a clutch member 63 and opposite the same is a coöperating clutch member 64 which latter is slidable on the countershaft 47 to engage the clutch member 63 and to be disengaged therefrom; and when said clutch members are engaged, the motion of the crank shaft 36 is transmitted through the pinion 53, gear 55, and clutch members 63 and 64 to the countershaft 47, the latter through the pinion 51 and the gear 45 propelling the traction wheel 13 on this side of the machine.

On opposite sides of the gear 52 are pinions 65 and 66 having spur teeth to mesh with the gear 52 and bevel teeth to mesh with the bevel gears 56 and 59, respectively, the bevel teeth of the pinion 65 being adapted to mesh with the gear 56, and the bevel teeth of the pinion 66 with the gear 59. These two pinions are slidably mounted on vertical shafts 67, and provided with hand-levers 68 for operating the same. The two sets of clutches hereinbefore described have suitable operating levers 69. These levers are all positioned near the seat 34 so as to be within easy reach of the driver.

When the pinion 65 is pushed down to bring its bevel teeth in mesh with the gear 56, the motion of the crank shaft 36 is transmitted to the countershaft 46 to drive the traction wheel on this side of the machine, the traction wheel on the other side being driven when the pinion 66 is pushed down to bring its bevel teeth in mesh with the gear 59.

The transmission gear hereinbefore described is designed to propel the machine forward as well as to back the same, and to make turns in either direction. When the machine is to go straight ahead, the clutch members 60 and 61 will be engaged, to provide a driving connection between the crank shaft 36 and the countershaft 46, the driving connection between the crank shaft and the countershaft 47 being had by pushing the pinion 66 down so that it meshes with the gear 59. The two traction wheels 13 are now driven in the same direction to propel the machine forward. To reverse or back the machine, the clutch members 60 and 61 will be disengaged, and the clutch members 63 and 64 will be engaged. The pinion 66 will also be disengaged from the gear 59, and the pinion 65 will be engaged with the gear 56. The traction wheels are now driven with a reverse motion. If a turn to the right is to be made, the pinions 65 and 66 will be thrown in mesh with the gears 56 and 59, with both clutches disengaged. The two traction wheels now turn in opposite directions. If the machine is to make a left turn, both clutches will be engaged, and the pinions 65 and 66 disengaged from the gears 56 and 59, whereupon the traction wheels are again driven in opposite directions but in directions the reverse to that during the last previous described position of the pinions and clutches. When both pinions 65 and 66 are in engagement with the gears 54 and 59, and both clutches are on, the machine will be locked.

The plows or other implements to be drawn by the tractor will be hitched to the auxiliary frame, and as said frame and the main frame are free to swing in a horizontal plane relative to each other, the main frame can be turned independently of the auxiliary frame upon disengaging the latch 19. When the two frames are locked by the latch, they turn together.

I claim:—

1. A tractor comprising a main frame, steering and traction wheels for said frame, a steering gear for the steering wheels, driving means for the traction wheels, an auxiliary frame, and a ring carried by said auxiliary frame, the main frame being located inside the ring and said ring forming a circular track on which the main frame is slidably mounted to permit relative turning movement of the frames.

2. A tractor comprising a main frame having radial arms carrying rollers at their outer ends, an auxiliary frame having a circular track on which the rollers are mounted to permit the frames to turn relative to each other in a horizontal plane, steering wheels and traction wheels for the main frame, a steering gear connected to the steering wheels, and driving means for the traction wheels.

3. A tractor comprising a frame, traction wheels and swiveled front and rear wheels supporting the frame, driving means for the traction wheels, means for imparting motion to the respective traction wheels in opposite directions simultaneously, and an auxiliary frame carried by the main frame, said frames being connected to turn relative to each other in a horizontal plane.

4. A tractor comprising a frame, traction wheels for said frame, countershafts carried by the frame and geared to the respective traction wheels, an axle on which the traction wheels are loosely mounted, a drive shaft, a gearing between the drive shaft and the countershafts for driving the respective countershafts simultaneously in opposite directions, and in the same direction, and a gearing between the axle and one of the countershafts.

5. A tractor comprising a frame, traction wheels supporting the frame, a drive shaft, a gearing between the drive shaft and the traction wheels for driving the respective traction wheels simultaneously in opposite directions and in the same direction, an axle on which the traction wheels are loosely mounted, and a gearing between the drive shaft and the axle.

6. A tractor comprising a frame, traction wheels for said frame, countershafts carried by the frame and geared to the respective traction wheels, bevel gears loose on the respective countershafts, a drive shaft, a bevel pinion on the drive shaft and meshing with the bevel gears, clutches for connecting the bevel gears to their shafts, bevel gears fast on the respective countershafts, a gear on the drive shaft, and pinions located on opposite sides of the last mentioned gear and in mesh therewith, said pinions having bevel teeth for driving connection with the respective bevel gears which are fast on the countershafts, and said pinions being shiftable to make and break the said driving connection.

7. A tractor comprising a frame, traction wheels for said frame, countershafts carried by the frame and geared to the respective traction wheels, bevel gears loose on the respective countershafts, a drive shaft, a bevel pinion on the drive shaft and meshing with the bevel gears, clutches for connecting the bevel gears to their shafts, bevel gears fast on the respective countershafts, a gear on the drive shaft, and pinions located on opposite sides of the last mentioned gear and in mesh therewith, said pinions having bevel teeth for driving connection with the respective bevel gears which are fast on the countershaft, said pinions being shiftable to make and break the said driving connection, an axle on which the traction wheels are loosely mounted, and a gearing between the axle and one of the countershafts.

In testimony whereof I affix my signature.

ALVIN BROWN.